United States Patent Office 2,972,770
Patented Feb. 28, 1961

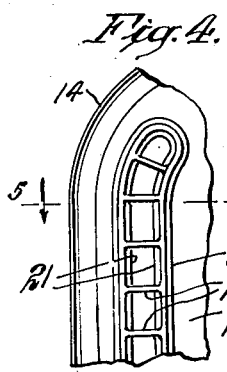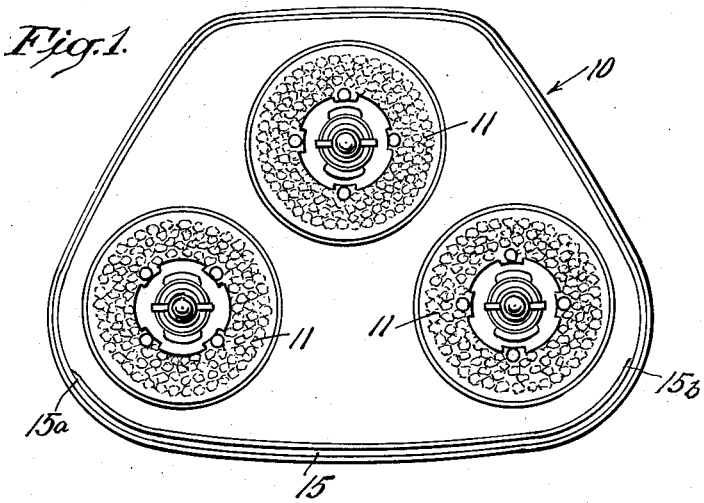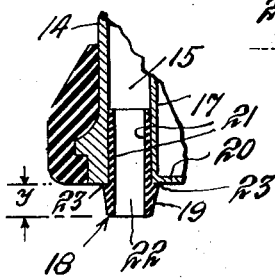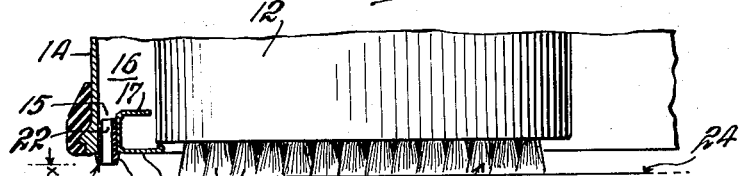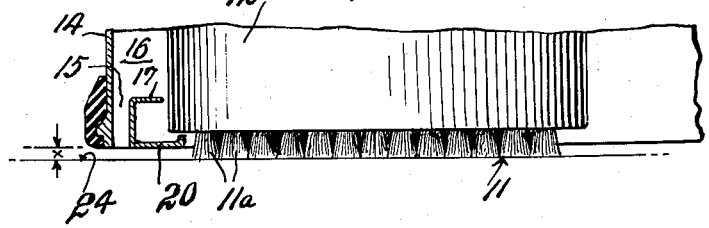

2,972,770

SURFACE TREATING APPARATUS

Nils Gunnar Cronhage, Bromma, Sweden, assignor to Aktiebolaget Electrolux, Stockholm, Sweden, a corporation of Sweden Filed Mar. 25, 1957, Ser. No. 648,409

Claims priority, application Sweden Mar. 29, 1956

1 Claim. (Cl. 15—354)

My invention relates to surface treating apparatus having a rotatable surface treating member adapted to be positioned on a surface and be moved thereover.

It is an object of my invention to provide improved apparatus of this kind in which an apertured member may be detachably secured to an air inlet at the underside of the apparatus to extend the inlet nearer to the surface.

Another object of the invention is to provide such an apertured member formed of resilient material having a portion capable of frictionally holding the member in place at the air inlet.

A further object of the invention is to provide such an apertured member for apparatus of this kind having at least one rotatable brush, the member being effective to extend the air inlet nearer to the surface by approximately one-half the unworn length of the brush bristles.

The invention, together with the above and other objects and advantages thereof, will be more fully understood upon reference to the following description and accompanying drawing forming a part of this specification, and of which:

Fig. 1 is a bottom plan view of surface treating apparatus embodying the invention;

Fig. 2 is a fragmentary vertical sectional view of the apparatus shown in Fig. 1;

Fig. 3 is a fragmentary vertical sectional view similar to Fig. 2 with a part thereof removed;

Fig. 4 is a fragmentary bottom view of the apparatus shown in Figs. 1 and 2; and Fig. 5 is a fragmentary sectional view taken at line 5–5 of Fig. 4 to illustrate parts in Fig. 2 more clearly.

Referring to the drawing, I have shown my invention in connection with surface treating apparatus 10 having rotatable brushes 11 which are detachably connected in any suitable manner within pulleys 12 and project downwardly beneath a base 14. The pulleys 12 are journalled in the base 14 in any suitable manner and arranged to be driven by an electric motor.

During operation of the apparatus 10, air may be drawn into the interior of the base 14 from the underside thereof through an inlet 15, such movement of air being effected by a fan unit which is also driven by the motor. Dust and dirt entrained in the air are separated therefrom when the air passes through a dust collecting member or filter provided in the apparatus. In order to simplify the drawing, I have not shown the fan unit, dust collecting member, electric motor and driving connections between the motor and pulleys, their illustration not being necessary for an understanding of my invention.

As best shown in Fig. 1, the air inlet 15 is in the form of an elongated slot which extends across the forward part of the base 14 between the regions 15a and 15b. Air drawn into the interior of the base 14 through the inlet 15 passes into a chamber which extends horizontally above the pulleys 12 and includes a downwardly depending part 16 in front of the pulleys at the vicinity of the inlet. From the chamber, which is defined in part by the side wall of the base 14 and a shield or partition 17, air may pass to the inlet of the fan unit.

In accordance with my invention, to promote the suction effect produced at the inlet 15 for drawing air and dirt into the space 16 from the immediate vicinity of the surface 24, the inlet is provided with an apertured member or insert 18 which includes a nose end or portion 19 projecting downwardly below a bottom plate 20 of the base 14 and an upwardly extending portion or fastening end having spaced apart sides 21 and shorter connecting ends, one of which is illustrated in Fig. 4, to provide an elongated slot. A number of spaced apart partitions 22 may be provided which bridge the gap between the sides 21 and extend vertically from the top or air exit end to the bottom or air admission end of the insert 18. The insert 18 desirably is formed of soft resilient material, such as rubber or foamed plastic, which is frictionally held in place at the inlet 15 and easily positioned on and removed from the base 14.

The downwardly extending portion or nose end 19 of the insert 18 is formed with outwardly extending shoulders which engage the bottom edge of the side wall of the base 14 and the bottom plate 20, as indicated at 23 in Fig. 5. Hence, when the insert 18 is positioned at the inlet 15 with its shoulders abutting the bottom plate 20 and the side wall of the base 14, the bottom portion 19 of the insert projects downwardly a definite distance from the underside of the base 14.

When the insert 18 is positioned at the inlet 15 at a time when the brushes 11 are new and the bristles 11a are not worn, the bottom of the insert is spaced a distance $x$ from the surface 24 being treated, as shown in Fig. 2. As the bristles 11a become shorter due to wear, the gap between the surface 24 and the bottom of the insert gradually becomes smaller. When the bristles 11a have become worn sufficiently, it is desirable to remove the insert 18 and operate the apparatus 10 without the insert, as shown in Fig. 3.

The inlet 15 at the lower end of the vertically extending passage 16, which may be referred to as a first inlet, is at a level which is above that of the lower ends of the bristles 11a when the base 14 is in an upright position and the bristles have become worn and the apertured member or insert 18 is not employed, as illustrated in Fig. 3. When the apertured member 18 is connected to the first inlet 15 at a time when the bristles 11a are new and unworn, as illustrated in Fig. 2, the downwardly extending nose end 19 thereof provides for the air passage 16, below the first inlet 15, another second inlet which is at a higher level than that of the lower ends of the bristles 11a with the latter carrying the dead weight of the base 14.

In surface treating apparatus like that illustrated in the drawing that has been built, I have employed inserts 18 provided with portions 19 which extend downwardly from the underside of the base 14 for a distance which is approximately one-half of the original unworn length of bristles 11a. Accordingly, when an insert 18 of this kind is employed in apparatus equipped with brushes 11 which are new, the height of the gap $x$ in Fig. 2, between the surface 24 and the bottom of the insert, is the same as the vertical height $y$ of the portion 19 of the insert, as indicated in Fig. 5. When the bristles 11a have become worn and are approximately one-half of their original length, the insert 18 is removed from the inlet 15, as shown in Fig. 3, whereupon air again is drawn into the air inlet of the apparatus 10 at a region spaced from the surface 24 by a distance $x$, the same vertical distance that is illustrated in Fig. 2.

In view of the foregoing, it will now be understood that the insert 18 desirably is used when the brushes 11 are new, thereby, in effect, extending the air inlet 15 downwardly and bringing it nearer to the surface 24 so that dust and dirt will be effectively removed therefrom when the bristles 11a are being initially subjected to wear. After bristles 11a have become worn and are about one-half of their original length, the insert 18 may be removed from the inlet to raise the effective height of the inlet 15 on the base 14. With this arrangement, the brushes 11 may be used for a further period of time, thereby prolonging the life of the brushes, and at no time during the entire life of the brushes will the air inlet 15 be removed from the surface 24 by a distance exceeding one-half of the unworn length of the bristles.

While I have shown and described a particular embodiment of my invention, it will be apparent to those skilled in the art that various modifications and changes may be made without departing from the spirit and scope of the invention, as pointed out in the following claim.

What is claimed is:

In floor polishing apparatus of the class described including structure providing a housing having a downwardly depending skirt about the periphery thereof and rotatable brush means having bristles adapted to be positioned on a surface and be moved thereover, the combination of means at the underside of the housing to provide an elongated slit defining a first inlet at the vicinity of the lower end of the skirt through which air is adapted to be withdrawn from the surface, an elongated apertured member having spaced elongated walls and connecting end walls defining an air passage which extends substantially parallel to the walls and has air admission and exit openings, at least the air exit opening end of the apertured member being formed of resilient material, and means including the air exit opening end of the elongated apertured member for detachably connecting the latter to the elongated slit with the air admission opening end thereof projecting downward and the air admission opening defining a second inlet which is removed from the surface, the means providing the elongated slit and the rotatable brush means being so constructed and formed that when the structure is in an upright position on the surface and the brush bristles are worn and about one-half of their original length, the first inlet defined by the elongated slit will be removed from the surface by a distance within one-half of the unworn length of the bristles, and the elongated apertured member being so constructed and formed that when the brush bristles are new and unworn it is effective to extend or project the inlet from the first inlet to the second inlet in a direction toward the surface by a distance approximately one-half the unworn length of the brush bristles.

References Cited in the file of this patent

UNITED STATES PATENTS

| 1,821,715 | Kuchinsky | Sept. 1, 1931 |
| 2,168,692 | Vidal | Aug. 8, 1939 |
| 2,220,224 | Faber | Nov. 5, 1940 |
| 2,276,943 | Dow | Mar. 17, 1942 |
| 2,609,555 | Anderson | Sept. 9, 1952 |

FOREIGN PATENTS

| 4,079 | Great Britain | 1913 |
| 275,734 | Switzerland | Sept. 1, 1951 |
| 282,992 | Switzerland | Sept. 1, 1952 |
| 714,928 | Great Britain | Sept. 8, 1954 |
| 1,124,748 | France | July 2, 1956 |